Figure 1:
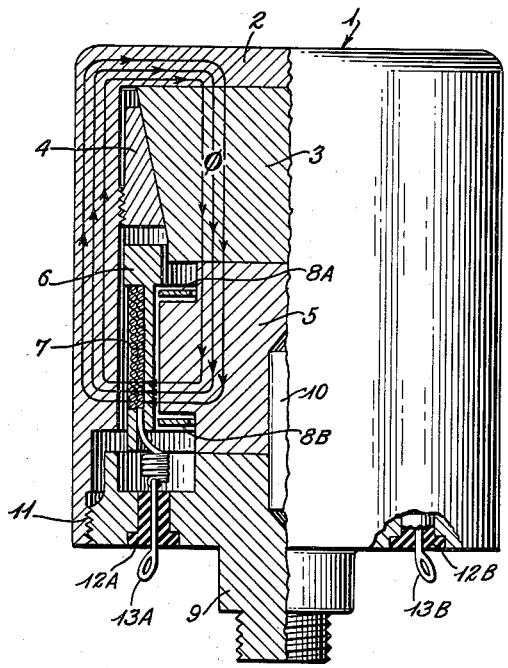

Oct. 16, 1962 — B. M. BAKER — 3,059,218
APPARATUS FOR COMBINED FLUID AND ELECTROMAGNETIC
DAMPING OF SEISMOMETER UNITS
Filed April 1, 1957

INVENTOR
*Buford M. Baker*

BY *Stevens, Davis, Miller & Mosher*
ATTORNEYS 3,059,218
APPARATUS FOR COMBINED FLUID AND ELECTROMAGNETIC DAMPING OF SEISMOMETER UNITS
Buford M. Baker, Houston, Tex., assignor to Texas Instruments Incorporated, Dallas, Tex., a corporation of Delaware
Filed Apr. 1, 1957, Ser. No. 649,785
7 Claims. (Cl. 340—17)

This invention relates broadly to geophysical exploration, and more particularly to eliminating parasitic vibrations which occur in the seismometer units employed in such exploration.

In modern day geophysical exploration, the physical vibrations emerging from the subsurface formations are applied to seismometer units to generate electrical output signals. Usually, the displacement of a plurality of electrical conductors situated within an electromagnetic flux field is relied upon to induce such electrical output signals.

The search for the most efficient method and means for attenuating certain spurious vibration frequencies poses a problem of long standing in the design of such seismometer units.

In some prior art systems, the suspended masses within the seismometer are damped by filling the voids in the device with a viscous liquid such as oil. By properly selecting the critical value of viscosity for the oil, the required damping effect is obtained. One of the greatest advantages associated with the use of such oil damped units is the elimination of the spurious responses caused by the oscillation of the various internal components at their natural resonant frequencies. Sustained vibration of such components at their characteristic natural frequencies is impossible because the viscous damping fluid envelops all such parts and continually retards all displacements thereof. However, the large change in the critical value of viscosity which occurs as a result of temperature variation renders it impossible to maintain the desired degree of damping over a large range of temperatures.

In other prior art seismometers, electromagnetic damping of the fundamental frequency of the main mass has been employed, in order to avoid the temperature errors encountered with viscous fluid damping. However, the freedom from temperature sensitivity enjoyed in such electromagnetically damped seismometers is offset by the inability of such units to properly damp the vibrations of many of the internal components at their natural resonant frequencies.

As a matter of fact, in the seismometer units which employ such electromagnetic damping of the fundamental frequency, there is almost no damping of the resonant vibrations of the internal springs, supports, electrical leads, and the like.

It will thus be obvious that the elimination of the troublesome temperature errors which characterize fluid damped seismometers has been accomplished only at the expense of enduring the parasitic vibrations associated with the oscillation of the various inner components at their resonant frequencies.

The present invention provides a novel method for eliminating the spurious effects caused by such parasitic vibrations, as well as the undesirable results attributable to fluid damping of the resonant vibration of the fundamental coil spring mass. Thus, the advantages stemming from the insensitivity of electromagnetic damping to temperature change are combined with the advantages associated with elimination of parasitic vibrations with fluid damping.

Accordingly, a primary object of this invention is to teach a method and apparatus for electromagnetically damping the fundamental frequency of a seismometer, and fluid damping the vibration frequencies of the associated internal components.

Another object of this invention is to teach a method and apparatus for attenuating spurious response frequencies by means of an oil having a viscosity low enough not to attenuate excessively the fundamental coil vibration.

Still another object of the invention is to disclose a seismometer design in which the seismometer is filled with a liquid having a value of viscosity low enough not to affect the electromagnetic damping, and high enough to effectively damp out spurious responses caused by resonant vibration of parts other than the main moving coil member.

These and other objects will become apparent by reference to the following detailed description and drawing in which like reference numerals indicate like parts and in which:

FIGURE 1 shows a partial section view of the preferred embodiment of the invention.

Referring now to FIGURE 1, the numeral 1 indicates generally the arrangement and co-relationship of the elements of the inventive seismometer structure. The structure includes a hollow cylindrical casing 2 which may be fabricated of iron, or other magnetically permeable material, in order to provide a low reluctance path to electromagnetic flux.

On the innermost radial surface of the casing 2 there is secured a frustro-conically shaped permanent magnet 3. The magnet 3 may be secured in place by means of an annular nonmagnetic retaining ring 4. The inner periphery of the ring 4 is beveled to provide an axially tapered surface which engages the peripheral surface of the permanent magnet 3. The outer periphery of the ring 4 may be secured to the concentric inner surface of the casing 2 by means of suitable screw threads, snap rings, or the like.

Directly below the permanent magnet 3, and maintained in abutting relation therewith, there is provided a circular pole piece 5. The pole piece 5 may be constituted of soft iron, or other equivalent material characterized by a suitably low reluctance to magnetic flux.

Between the outer axial periphery of the pole piece 5 and the concentric inner surface of the cylindrical casing 2, there is an annular space. Within this space there is located an annular metallic spool 6 with a plurality of electrical conductors 7 provided thereon in the form of a current conductive coil.

The plural flux lines $\phi$ emanating from the permanent magnet 3 course axially downward through the pole piece 5, and radially outward to thread the conductors 7. The flux lines close upon themselves, and complete the magnetic circuit by traveling along the walls of the cylindrical casing 2, as shown. It will be appreciated that the displacements are imparted to the metallic spool 6 in response to earth borne vibrations and the like. Such displacements cause the conductors 7 to cut the flux lines $\phi$, and result in an induced electrical output signal.

Since relative movement of the metallic spool 6 with respect to the electromagnetic flux lines causes induced currents to flow within the spool itself, each of such currents will be encircled by its own elemental flux pattern. The direction of this induced flux will, of course, be such that it opposes the main flux which threads the spool, and motion of the spool will thus be retarded. The degree of damping action achieved in this manner is dependent upon the strength of the flux induced within the spool. Since the induced flux is dependent on the induced current, it will be seen that certain physical constants such as the resistivity of the spool metal may be predetermined to provide any desired degree of damping. Alternatively, magnets of varying strength may be employed to control the value of the main flux $\phi$. Or, the reluctance of the pole piece 5 or the casing 2 may be selected to provide the proper flux strength required for any desired degree of damping.

The several methods by which the flux strength may be proportioned to exploit the temperature free characteristic of electromagnetic damping will now be appreciated. The method for utilizing fluid damping to damp resonant vibration of parts other than the moving coil will be explained presently.

Since the spool 6 cannot, of course, float unrestrained in the annular space provided, a resilient suspension unit which is designated diagrammatically by the reference character 8A and 8B is provided. The resilient suspension unit 8A—8B is shown in proximity to the circular pole piece 5.

Directly below pole piece 5 there is shown a non-magnetic closure cap 9. The cap 9 may be fabricated of brass or other equivalent non-ferrous material which is nonmagnetic. The cap 9 is maintained in spaced relation with the pole piece 5 by means of the axially located dowel 10. The engagement of cap 9 with the cylindrical casing 2 is effected by means of suitable screw threads 11.

Within the closed seismometer unit, it will be appreciated, all voids are filled with a damping fluid of suitable viscosity. For instance, in the present invention, a composite mixture of two Dow Corning silicone fluids having a viscosity of 3.0 centistokes was employed with negligible effect upon the overall response obtained with electromagnetic damping. Although the parasitic vibrations of the springs, supports, resilient suspension unit and the like were extremely attenuated, the viscous mixture exerted a negligible damping effect on the fundamental coil spring vibration. It was observed that the viscous damping had little or no effect upon the spool 6 during motion in the axial direction at its fundamental resonant frequency. On the other hand, the mixture of silicone fluids substantially eliminated the vibrations stemming from the harmonic oscillation of parts other than the moving coil.

By way of further example a 58 cycle per second spurious response was observed in one of the novel seismometer units constructed according to this invention. This response was caused by the combined effects of the rotational movement of inertia of the spool 6 with the horizontal deflection rate of the resilient suspension unit. Quantities of Dow Corning silicone fluids having dynamic viscosities of 1 and 50 centistokes, respectively, were combined in proportions yielding an ultimate viscosity of 3.0 centistokes. This mixture above alone damped the seismometer to .2 critical. The overall damping of .6 critical obtained by adding the effect of electrodynamic damping was substantially unaffected. Thus the mixture of silicone fluids provided a value of viscosity low enough to exert a substantially negligible effect on the desired electromagnetic damping, and high enough to effectively eliminate the spurious responses caused by parasitic vibration of parts other than the spool 6 at their respective resonant frequencies. The temperature free characteristics of electromagnetic damping of the fundamental coil spring vibrations were maintained intact.

In order to permit egress of electrical signals induced in conductors 7, and insulated output terminal 12A is mounted in the radial end wall of the closure cap 9. Such egress is effected by means of lead-through element 13A which penetrates the insulated terminal as shown. Although the symmetry of the invention has permitted adequate illustration by use of a half section, it will be appreciated that a second output terminal 12B, with associated lead-through element 13B is provided on the right hand side of the seismometer unit shown in FIGURE 1.

While, therefore, I have disclosed my invention in full clear and concise terms as required by the statute, it will be obvious that various modifications, substitutions and alterations may be made therein without departing from the spirit and scope of the appended claims.

What I claim is:

1. A seismometer unit employing combined fluid and electromagnetic damping which includes, magnetically permeable casing means, resiliently mounted coil means, a source of magnetomotive force for producing a flux field which threads both said coil means and said casing means, closure means mounted to seal said casing means, means including said casing and coil means for providing a low reluctance and large cross-sectional area path for said flux field to deliberately enhance the electromagnetic damping of the coil means effected thereby, and fluid means contained within said casing means to simultaneously attenuate substantially only those resonant vibrations occurring at frequencies other than that of the coil means.

2. A seismometer unit employing combined fluid and electromagnetic damping which includes, cylindrical casing means having at least one internally threaded open end, closure means mounted to threadedly engage said open end and seal said casing means, movable conductive coil means resiliently mounted for displacement within said casing, means mounted to provide a longitudinally extending electromagnetic flux field having a large cross-sectional area which intercepts a relatively large cross-sectional area of said conductive means and generates an internally induced damping flux during displacements thereof, and fluid means disposed within said unit to envelop and contact the exposed surface areas of all elements contained therein to provide fluid damping of all movable surface areas simultaneously with the said electromagnetic damping of the conductive means.

3. In a sealed seismometer unit for producing an electrical output signal in response to physical vibrations, a metallic conductor carrying spool mounted to incur displacements responsive to said physical vibrations, a flux field mounted to penetrate said spool to induce output signals in said conductor and damping fluxes in said spool during said displacements thereof, and a volume of viscous fluid disposed within said casing to impede relative motion at the resonant frequencies of any elements other than said conductor carrying spool.

4. A seismometer unit employing combined fluid and electromagnetic damping which includes, a hollow cylindrical metallic casing having a flat end wall, a frustro-conical permanent magnet abutting the end wall of said casing, a non-magnetic means supporting said magnet from the inner circumference of said casing, a magnetically permeable circular pole piece disposed to abut said magnet and define a concentric annular space adjacent to the inner axial periphery of said casing, a closure cap mounted to threadedly engage the inner periphery of said casing and maintain said pole piece in said abutting relation with said magnet, a movable coil-carrying spool of substantial cross-sectional area and length of conducting material resiliently disposed in said concentric annular space to intersect flux lines emanating from said permanent magnet, and a supply of viscous damping fluid disposed to fill the voids within said seismometer unit, the viscosity of said fluid being such that said fluid has negligible damping effect on said spool.

5. A seismometer unit employing combined fluid and electromagnetic damping which includes, a casing, a magnet disposed within said casing, magnetically permeable means mounted to provide a complete circuit for flux lines emanating from said magnet; a metallic spool including a metallic coil resiliently mounted to intercept said flux lines for relative movement with respect thereto, said flux lines, said magnetic means, and said metallic coil combining to damp vibrations at the fundamental frequency of said coil; a non-magnetic closure cap mounted to enclose an open end of said casing, and a supply of damping fluid contained within said seismometer and characterized by a viscosity low enough to prevent damping of the fundamental coil frequency.

6. A seismometer unit containing internal movable components and employing combined fluid and electromagnetic damping comprising: magnetically permeable casing means, resiliently mounted coil means, a source of magnetomotive force for producing a flux field which threads both said coil means and said casing means, closure means mounted to seal said casing means, means including said casing and coil means for providing a low reluctance path for said flux field to enhance the electromagnetic damping of the coil means effected thereby, and a low viscosity fluid means contained within said casing means to attenuate substantially only those vibrations of the components which are of lower energy than the resonant frequency of the coil means.

7. A seismometer unit containing a stationary structure, internal movable components in said stationary structure and employing combined fluid and electromagnetic damping, comprising: a main movable mass adapted to vibrate relative to said stationary structure in response to an earth induced motion, said mass comprising a metallic spool and a winding of electrical conductors rigidly positioned on said spool, a flexible lead between each end of said conductors and said stationary structure, a flexible spring between said movable mass and said stationary structure, a pole piece in said stationary structure so positioned that virtually all of its flux cuts both said metallic spool and said conductors and provides electromagnetic damping to said main movable mass, said stationary structure defining a sealed internal cavity having access to said flexible leads and to said flexible spring, and an oil in said cavity having a viscosity suited to critically damp said flexible leads and spring without appreciably damping said main movable mass.

References Cited in the file of this patent

UNITED STATES PATENTS

| | | |
|---|---|---|
| 2,002,372 | Greentree | May 21, 1935 |
| 2,067,636 | Heiland | Jan. 12, 1937 |
| 2,271,864 | Honnell | Feb. 3, 1942 |
| 2,348,225 | Petty | May 9, 1944 |
| 2,387,223 | Carson | Oct. 16, 1945 |
| 2,582,994 | Kendall | Jan. 22, 1952 |
| 2,659,065 | Cordell | Nov. 10, 1953 |
| 2,675,533 | Brown | Apr. 13, 1954 |
| 2,740,946 | Geneslay | Apr. 13, 1956 |